United States Patent [19]

Haefner et al.

[11] Patent Number: 5,152,360
[45] Date of Patent: * Oct. 6, 1992

[54] THROTTLE CABLE INTERVENTION DEVICE

[75] Inventors: Donald R. Haefner, Oak Park; David M. Preston, Madison Heights, both of Mich.

[73] Assignee: Eaton Corporation, Cleveland, Ohio

[*] Notice: The portion of the term of this patent subsequent to Jul. 10, 2006 has been disclaimed.

[21] Appl. No.: 381,550

[22] Filed: Jul. 18, 1989

[51] Int. Cl.⁵ .................. B60K 28/16; E02D 9/08; E02D 11/00; E02D 11/02
[52] U.S. Cl. ............................ 180/197; 123/342
[58] Field of Search ................ 180/197, 335, 178; 123/340, 342, 361, 399

[56] References Cited

U.S. PATENT DOCUMENTS

| | | | |
|---|---|---|---|
| 1,582,239 | 4/1926 | Barbarou | |
| 3,737,142 | 6/1973 | Boswell et al. | 74/107 X |
| 4,367,805 | 1/1983 | Totani et al. | 180/179 |
| 4,473,049 | 9/1984 | Jahr | 123/396 |
| 4,474,083 | 10/1984 | Braun | 74/867 |
| 4,523,667 | 6/1985 | Smyth | 192/0.092 |
| 4,531,430 | 7/1985 | Holmes | 74/858 |
| 4,543,932 | 10/1985 | Sturdy | 123/342 |
| 4,559,912 | 12/1985 | Larom et al. | 123/350 |
| 4,703,823 | 11/1987 | Yogo et al. | 180/197 |
| 4,714,864 | 12/1987 | Yogo et al. | 318/52 |
| 4,721,176 | 1/1988 | Kabasin et al. | 180/197 |
| 4,722,411 | 2/1988 | Ohashi et al. | 180/197 |
| 4,747,380 | 5/1988 | Eijiri et al. | 123/399 |
| 4,750,582 | 6/1988 | Maas | 180/197 |
| 4,768,483 | 9/1988 | Asayama | 23/399 |

Primary Examiner—Mitchell J. Hill
Attorney, Agent, or Firm—R. A. Johnston

[57] ABSTRACT

A vehicle engine throttle valve control device (10;121) is applied intermediate the vehicle operator's accelerator pedal (14) and the engine's throttle body (12) to selectively override or modify the operator's ability to control vehicle/engine speed and to assert independent control thereof as a function of various input parameters (49,50,52,54). Linkages (26,28) interconnect opposed ends of a lever (18;136) respectively, with accelerator and throttle. The lever rotates upon a pivot (20;126) which is selectively displaceable to effectively shorten or lengthen the linkage in response to an operator independent signal from a control circuit (42).

4 Claims, 4 Drawing Sheets

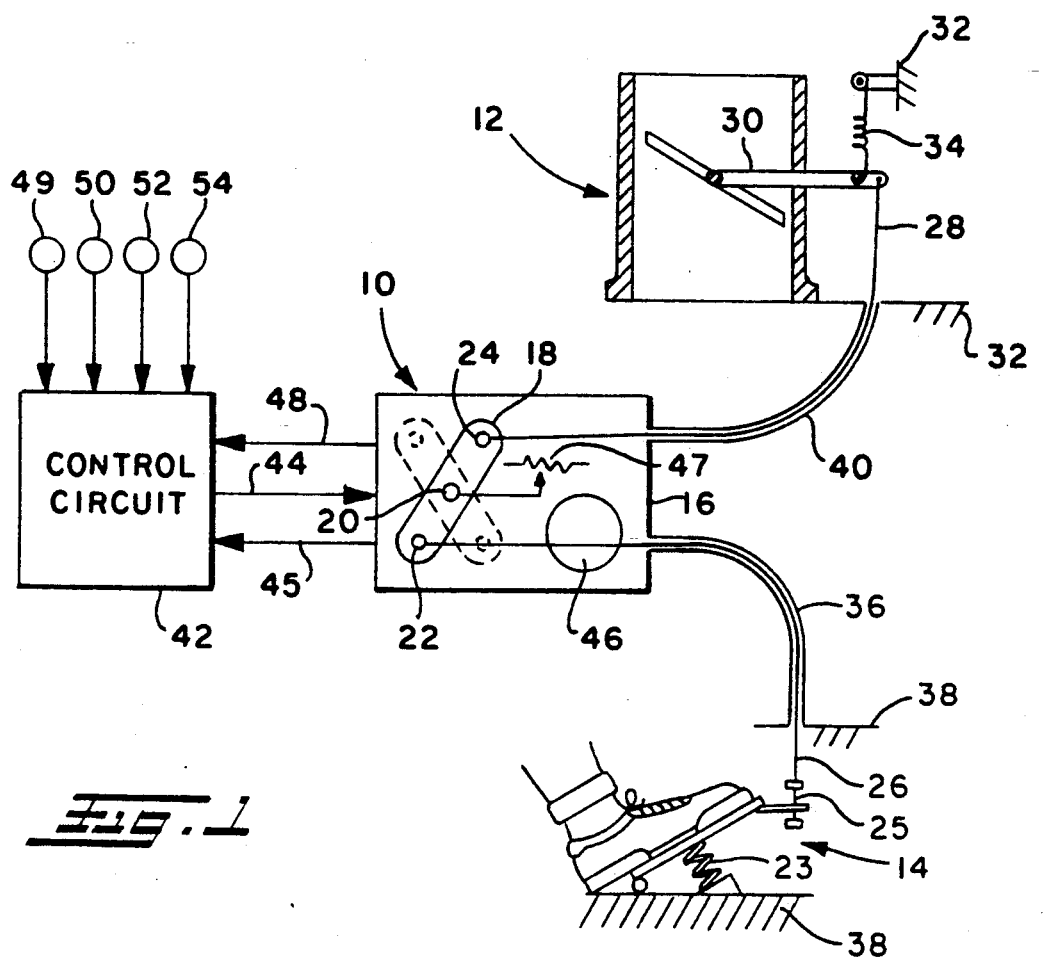
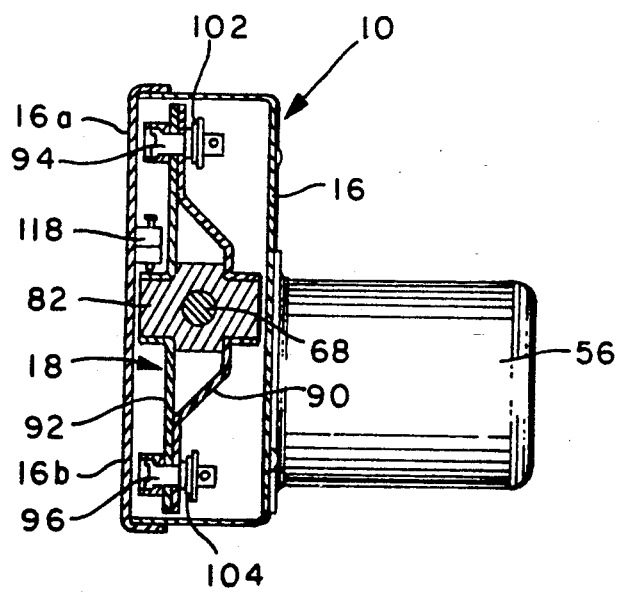

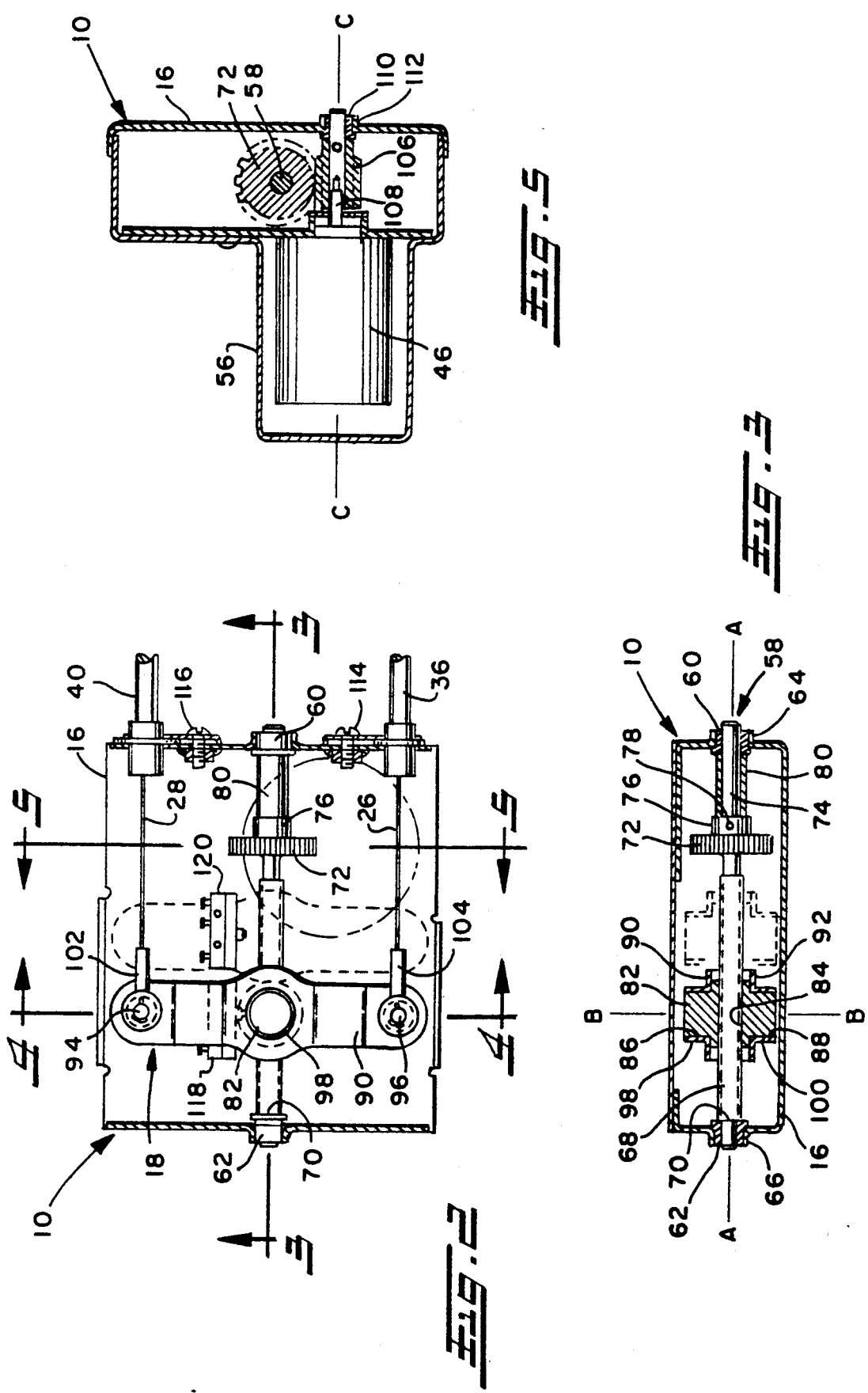

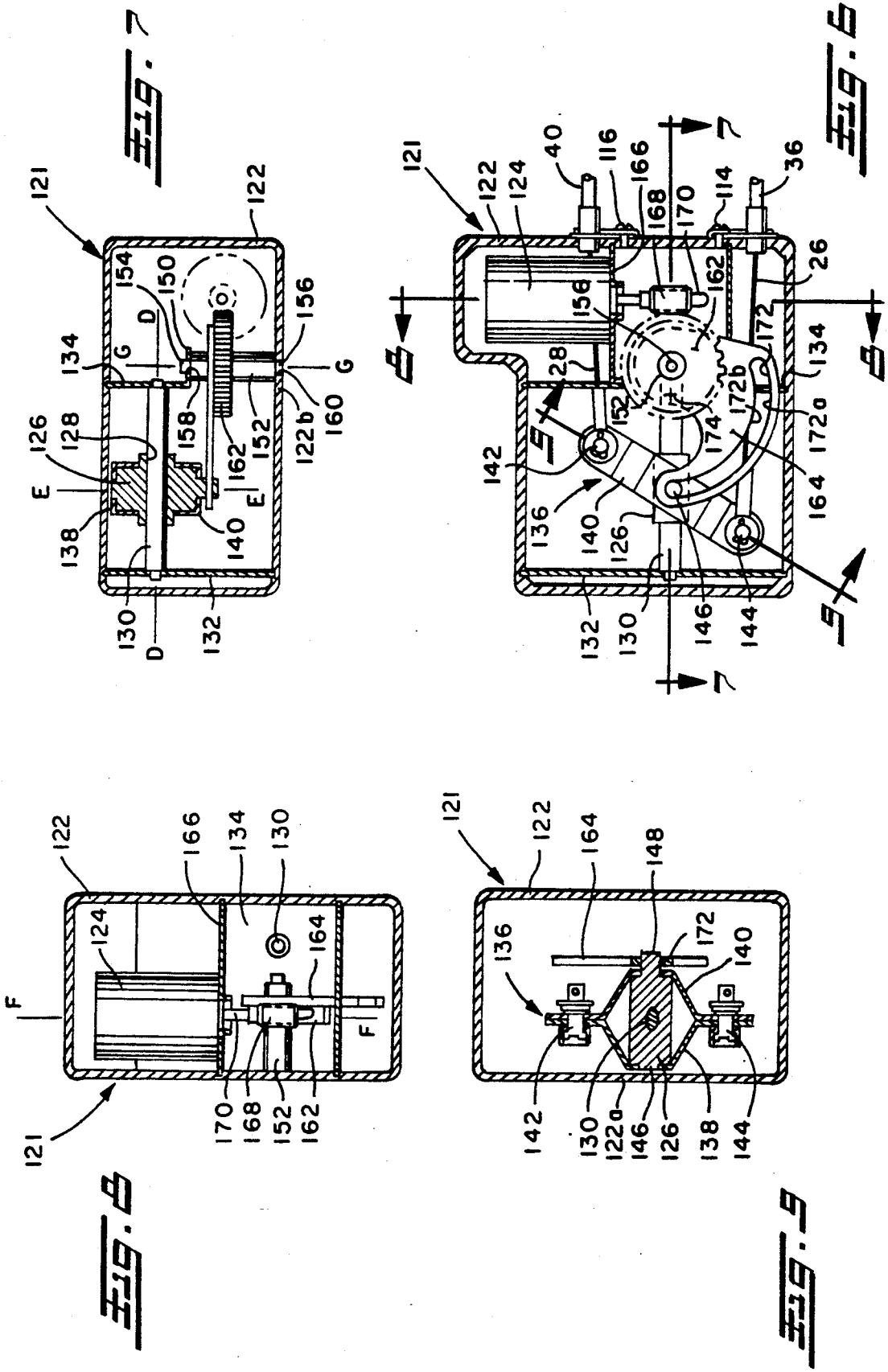

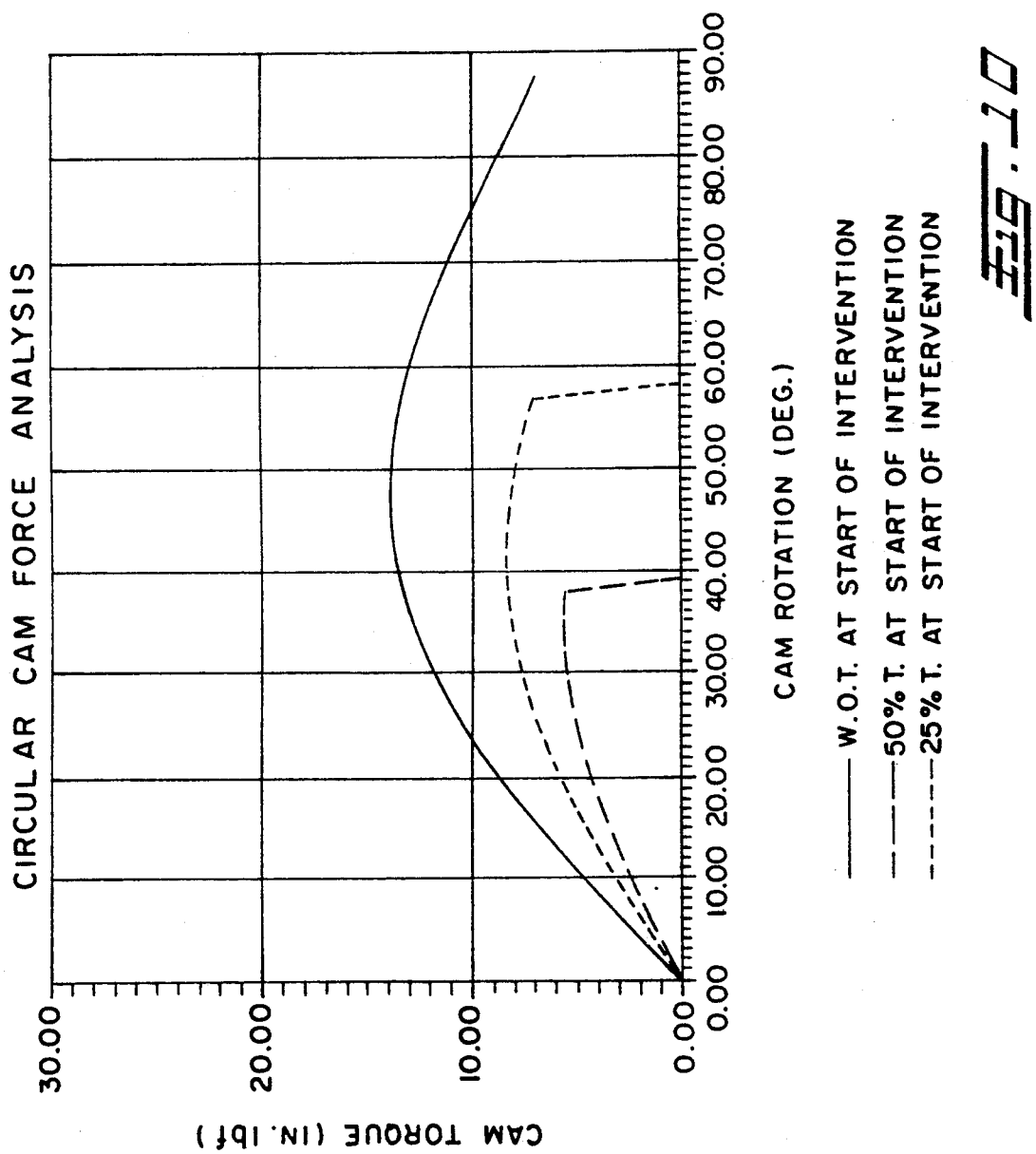

THROTTLE CABLE INTERVENTION DEVICE

INTRODUCTION

The present invention relates to throttle valve control device for internal combustion engines, and more particularly to vehicle throttle intervention devices which inhibit, limit or modify operator control.

CROSS REFERENCE

The subject matter of this application is related to that of an application filed on even date herewith entitled "Split Arm Throttle Cable Intervention Device" naming inventors Donald Haefner and David Preston and identified as application Ser. No. 381,551, now U.S. Pat. No. 4,940,109 issued on Jul. 10, 1990.

BACKGROUND OF THE INVENTION

Ground vehicles such as automobiles and trucks propelled by internal combustion engines are typically controlled by an operator accelerator pedal which is directly mechanically linked to an engine speed controlling device such as a throttle body or fuel injection pump. Recently, so called fly-by-wire systems have been considered for automotive applications which replace the accelerator pedal to throttle body mechanical linkage with an electrical control system in which the operator input is an electrical signal to a controller which is processed, amplified and output to an actuator or motor for positioning the vehicle throttle. Fly-by-wire systems provide the advantage of accepting operator speed demand as only one of a number of input parameters which determine the ultimate positioning of the throttle and thus permit overriding or modifying a driver input if safety or performance considerations so require. Typical systems requiring throttle intervention include traction control, cruise control and engine speed governing.

Although fly-by-wire techniques have found acceptance in aerospace and certain industrial applications, its penetration in the automotive industry has been limited due to countervailing considerations of reliability and economy.

A compromise approach to vehicle throttle control thus employs conventional mechanical linkage between the accelerator pedal and the throttle body in combination with electromechanical devices which alter the linkage geometry to permit the implementation of traction control and other features while retaining proven throttle control techniques. Although such systems are gaining acceptance, they tend to be slow to respond to rapid changes in input parameters and, in traction control applications, can require the application of vehicle brakes during periods of operator acceleration demand.

It will be apparent from a reading of the specification that the present invention may be advantageously utilized with throttle controls for internal combustion engines intended for many different applications. However, the invention is especially useful when applied to the accelerator pedal-throttle body linkage of an automotive vehicles, and will be described in connection therewith.

BRIEF DESCRIPTION OF THE INVENTION

The present invention finds particular application in an automobile powered by an internal combustion engine in which the vehicle operator establishes a vehicle speed by depressing an accelerator pedal mechanically linked to the engine throttle body. A mechanism is interposed between the throttle body and accelerator pedal which operates to control engine speed independently of operator demand by varying the geometry or effective length of the linkage. The mechanism includes a first member mounted for displacement along the first fixed line of action and adapted for slaved movement with the accelerator pedal. A second member is mounted for displacement along a second fixed line of action which is generally parallel to the first line of action and adapted for slaved movement with the throttle body. A motion transfer element or lever mounted for limited rotation upon a pivot serves to interlink the first and second members which are affixed thereto at respective attachment points spaced from one another as well as the pivot. Finally, an actuator operates to selectively displace the pivot between end limits of travel to effect intervening control of the engine. This arrangement provides extremely responsive throttle control independent of operator demand for the implementation of traction control, cruise control and the like.

In the preferred embodiment of the present invention, the actuator means comprises a motor driven threaded shaft which carries a shuttle defining the lever pivot. The intervention device further includes a controller which operates to receive parametric inputs such as vehicle and drive wheel speed information, shuttle end of travel, and throttle body/accelerator position feedback and generate a control signal as a function thereof to control the electric motor. This arrangement has the advantage of providing a throttle intervention device which is extremely simple and cost effective.

According to an alternative embodiment of the invention, the pivot shuttle is slidably carried for linear displacement on an elongate guide member. The shuttle is positioned by an electric motor through an intermediate desmodronic cam member which entraps a guide pin laterally extending from the shuttle. This arrangement provides the advantage of a simplified assembly and fabrication techniques.

Various other features and advantages of this invention will become apparent upon reading the following specification, which, along with the patent drawings, describes and discloses a preferred illustrative embodiment of the invention as well as an alternative embodiment of the invention in detail.

The invention makes reference to the accompanying drawings.

BRIEF DESCRIPTION OF THE DRAWINGS

FIG. 1, schematically illustrates the throttle cable intervention device of the present invention connected between an accelerator pedal and a throttle body in the idle throttle position;

FIG. 2, is an elevational view of the preferred embodiment of the throttle cable intervention device of FIG. 1 on an enlarged scale and in greater detail with a portion thereof cut away;

FIG. 3, is a sectioned view looking along line 3—3 of FIG. 2;

FIG. 4, is a sectioned view looking along line 4—4 of FIG. 2;

FIG. 5, is a sectioned view looking along line 5—5 of FIG. 2;

FIG. 6, is an elevational view of an alternative embodiment of the throttle cable intervention device of FIG. 1 on an enlarged scale and in greater detail with a portion thereof cut away;

FIG. 7, is a sectioned view looking along line 7—7 of FIG. 6;

FIG. 8, is a sectioned view looking along line 8—8 of FIG. 6;

FIG. 9, is a sectioned view looking along line 9—9 of FIG. 6; and

FIG. 10, is a graphical force analysis of circular cam reaction torque versus rotation of the throttle cable intervention device of FIGS. 6-9.

DETAILED DESCRIPTION OF THE DRAWINGS

Referring to FIG. 1, a device is illustrated which allows electronic intervention of a mechanical throttle control system. The intervention device will be described as part of a traction control system, effecting throttle closure during periods of host vehicle wheel slip.

The system of FIG. 1 includes a throttle cable intervention device or mechanism 10 mechanically interposed between a throttle body 12 and accelerator pedal 14 of an associated host vehicle. As will be described in detail herein below, intervention device 10 includes a housing assembly 16 enclosing an elongated lever 18 or motion transfer device mounted for limited rotation upon a pivot 20. Lever 18 defines first and second attachment points 22 and 24, respectively, at opposed ends thereof straddling pivot 20. A first draw cable 26 interconnects attachment point 22 and accelerator pedal 14. A compression spring 23 tends to bias pedal 14 toward the idle position and a slip-joint 25 provides limited lost motion between pedal 14 and cable 26 for enhanced operator "feel". Likewise, a second draw cable 28 interconnects attachment point 24 and throttle plate operating linkage 30 of throttle body 12. Throttle body 12 is mounted to an internal combustion engine indicated at 32. A return spring 34 interconnects linkage 30 with a grounded point of IC engine 32 to urge throttle body 12 toward the idle position. Draw cable 26 is enclosed within a sheath 36 which is affixed at one end to housing 16 and at the opposite end to the chassis 38 of the host vehicle. Likewise, draw cable 28 is enclosed within a sheath 40 connected at one end to housing 16 and at the opposite end to IC engine 32. As is well understood in the art, both draw cables 26 and 28 and sheaths 36 and 40 are radially flexible but axially rigid. Thus, although IC engine 32 will tend to move somewhat with respect to chassis 38, the dimension along the line of action of draw cables 26 and 28 interconnecting accelerator pedal 14 and throttle body 12 with lever 18 will remain fixed and the respective positional relationship between accelerator pedal 14 and throttle plate of throttle body 12 will vary only upon displacement of pivot 20. This arrangement provides the advantage of extremely flexible and adaptive mounting of intervention device 10 with various vehicle chassis/engine configurations. It is understood that the pull cable arrangement illustrated in FIG. 1 is by way of example and could be substituted with a conventional system of rigid links and bell cranks.

When the vehicle operator demands additional vehicle speed by pressing down on the accelerator pedal 14, draw wire 26 will tend to rotate lever 18 from its illustrated idle position toward the full throttle (phantom) position. Rotation of lever 18 will pull on cable 28, tending to open throttle body 12, increasing the speed of the host vehicle. Conversely, when the operator reduces the pressure applied to the accelerator pedal 14, spring 34 will tend to return throttle body 12 to the idle position and simultaneously draw lever 18 and accelerator pedal 14 back to their illustrated positions.

As will be described in detail herein below, throttle cable intervention device 10 includes an adjustment mechanism controlled by an electronic circuit 42 which generates a control signal on conductors 44 connected to a dc motor 46 within device 10. Motor 46 is mechanically interconnected to actively position pivot 20 as will be described herein below. Likewise, the presence of lever 18 at either of its end limits of travel is output as a signal from intervention device 10 on conductors 48 to control circuit 42. Furthermore, a relative position signal is output on conductors 45 from a position sensor 47 such as a potentiometer mounted to pivot 20 within intervention device 10. Other parametric inputs to control circuit 42 are provided including, but not limited to, vehicle speed 49, driven wheel speed 50, throttle body feedback position 52, and accelerator pedal position feedback 54. Inasmuch as traction control circuits are widely known, the details of control circuit 42 are deleted here for the sake of brevity, it being understood that any number of suitable configurations are available.

Referring to FIGS. 2-5, the details of intervention device 10 are illustrated. Housing 16 is formed of sheet metal or other suitable material in a generally rectangular configuration with a generally cylindrical motor cover portion 56 affixed thereto. Because intervention device 10 may be subjected to a relatively harsh environment, it is contemplated that suitable sealing and mounting provisions (not illustrated) will be made.

A shaft indicated generally at 58 is mounted within housing 16 and is supported therein at its extreme ends by suitable bushings 60 and 62 supported in opposed outwardly opening bosses 64 and 66 integrally formed within housing 16. Shaft 58 has a threaded portion 68 terminating at its left end (as viewed in FIGS. 2 and 3) in a step 70 abutting a thrust surface formed by bushing 62. Threaded portion 68 of shaft 58 terminates at its right end adjacent a worm gear 72 pressed upon a smooth portion 74 of shaft 58. Worm gear 72 includes an integral hub 76 and is affixed for rotation with shaft 58 by suitable fastening means such as a radial pin 78. Smooth portion 74 extends through a tubular spacer 80 extending between the righthand most surface of hub 76 and a thrust surface defined by bushing 60. Thus, as illustrated, shaft 58 is axially restrained in both directions within housing 16 but is free to rotate therein.

A generally cylindrically shaped carrier or shuttle 82 includes a centered radially disposed threaded through passage 84. Threaded portion 68 of shaft 58 threadably engages carrier 82 within through passage 84. The ends (top and bottom as viewed in FIG. 3) of carrier 82 have steps 86 and 88 formed therein which co-act to comprise pivot 20 for crank arm or lever assembly 18. Lever 18 consists of elongated complimentary half portions 90 and 92 which are joined at the respective ends thereof by pivot assemblies 94 and 96 and are centrally spaced to entrap carrier 82 wherein steps 86 and 88 extend outwardly through respective integrally formed outwardly extending bosses 98 and 100. Thus, lever 18 is retained in assembly with carrier 82 and is displaceable therewith along shaft 58 axis of rotation designated A—A. Furthermore, lever 18 is free for limited rotation about axis B—B upon steps 98 and 100 of carrier 82. Finally, as best viewed in FIG. 4, although lever 18 and carrier 82 are nominally free to rotate about axis A—A of shaft 58, such rotation is prevented by close spacing between pivot assemblies 94 and 96 and adjacent wall portions 16a and 16b of housing 16.

Draw cables 26 and 28 are each terminated in a member or swivel 102 and 104, respectively, interconnected with pivot assembly 94 and 96, respectively. In application, swivels 102 and 104 are displaced along the substantially parallel linear lines of action of their respective draw cables.

Motor 46 is mounted to housing 16 and has a worm 106 mounted to the output shaft 108 thereof for rotation about an axis designated C—C. Worm 106 is in engagement with worm gear 72 and has its free end (righthand most as viewed in FIG. 5) supported by a bushing 110 extending within an integral outwardly opening boss 112 within housing 16.

Sheaths 36 and 40 are rigidly affixed to housing 16 by suitable terminations and mounting hardware 114 and 116, respectively. Two spaced momentary contact switches 118 and 120 are mounted within housing 16 along the line of travel of boss 98 whereby when carrier 82 and lever 18 reach a leftward limit of travel as viewed in FIG. 2, the outer circumferential surface of boss 98 cams against the contact of switch 118, causing it to change electrical state. Likewise, when lever 18 and carrier 82 advance rightwardly as viewed in FIGS. 2 and 3 (in phantom) to a position wherein boss 98 cams against the contact of switch 120, its electrical state will change. Thus, lever 18 and carrier 82 are illustrated in their limits of travel along axis A—A. Motor 46 is interconnected with control circuit 42 via conductors 44 and switches 118 and 120 are electrically connected to control circuit 42 via conductors 48. Potentiometer 47 (FIG. 1) includes a wiper linked for travel with pivot 20 and a resistor portion carried by housing 16 in a usual manner to provide a characteristic resistance for each point of travel of pivot 20 between its limits of travel. Potentiometer 47 is interconnected with control circuit 42 via conductors 45. Conductors 44, 45 and 48 and potentiometer 47 are not illustrated in drawing FIGS. 2-5 for the sake of simplicity.

In FIG. 2, lever 18 is illustrated in solid line under the condition where no throttle cable intervention is taking place and the throttle is positioned approximately half way between idle and full throttle position. With motor 46 de-energized, the intermeshing of worm gear 72 and worm 106 will prevent rotation of shaft 58 and thus carrier 82 will remain in its illustrated position fixing the pivot point of lever 18 about axis B—B shown in FIG. 3. As described herein above, if the accelerator pedal 14 is further advanced, draw wire 26 will tend to rotate lever 18 counterclockwise, in turn, pulling draw wire 28 to the left as illustrated in FIG. 2 further opening the throttle 12. Boss 98 remains in contact with switch 118 whereby the control circuit 42 is disabled from generating anything but a dc voltage signal which will drive motor 46 in a rotational sense to displace carrier 82 rightwardly as viewed in FIG. 2. Based upon parametric inputs from transducers 49, 50, 52, and 54, when control circuit 42 determines that wheel slip is taking place, and that lever 18 is other than in its full intervention (phantom) position, control circuit 42 will output a dc voltage level on conductors 44 to energize motor 46 and thereby rotate shaft 58. Rotation of shaft 58 will cause carrier 82 and lever 18 to translate rightwardly. Assuming that the vehicle operator maintains the accelerator pedal 14 in a fixed position, lever 18 will tend to rotate clockwise about attachment point 22 as carrier 82 translates rightwardly from the position illustrated in solid line in FIG. 2. Conversely, when control circuit 42 senses that wheel slipping no longer occurs and that lever 18 is axially positioned at other than its solid line illustrated position in FIG. 2, it will output a dc voltage of opposite polarity on conductors 44 to drive motor 46 in the reverse direction thereby translating carrier 82 leftwardly as viewed in FIG. 2 until either boss 98 contacts switch 118 or control circuit 42 again senses a wheel slip condition.

Referring to FIGS. 6, 7, 8, and 9 an alternative embodiment of the present invention is illustrated. Except as explicitly described herein below, corresponding components function as previously described with reference to the preferred embodiment.

The alternative embodiment of the invention is embodied in a throttle cable intervention device 121 which includes a housing 122 fully enclosing a dc motor 124 and serves as an attachment point for sheaths 36 and 40. A stepped carrier 126 defines a smooth centered through bore 28 through which is slip fit a smooth guide member 130 which is held in its illustrated position by suitable partitions 132 and 134. A lever 136 is formed of symmetrical half portions 138 and 140 which are elongate and held together near the ends thereof by pivot assemblies 142 and 144. The central portions of half portions 138 and 140 are spread to capture carrier 126 and retain them in assembly as illustrated whereby carrier 126 and lever 136 are free to translate in assembly along axis D—D of guide member 130 and lever 136 is free for limited rotation about axis E—E of carrier 126.

Lever 136 rotates about an axis E—E upon outwardly extending pins 146 and 148 integrally formed within carrier 126 which extend through registering openings within half portions 138 and 140, respectively. The assembly of carrier 126 and lever 136 is thus free to slide along axis D—D of guide member 130 but is prevented from rotation by close spacing of half portion 138 with an adjacent wall portion 122a of housing 122. Alternatively, bore 128 and guide member 130 can have axially directed complementary splines or other suitable shapes formed therein to prevent relative rotation while ensuring relative axial freedom of displacement. Draw wires 26 and 28 are connected to pivot assemblies 144 and 142, respectively, as described herein above. Partition 134 has an offset portion 150 spaced parallel with a wall portion 122b of housing 122. An axle 152 interspaces offset portion 150 and wall portion 122b of housing 122 and is retained in position by integral outwardly extending pins 154 and 156 disposed within registering holes 158 and 160, respectively. As best viewed in FIG. 7, axle 152 is free to rotate about its axis defined by pins 154 and 156, designated axis G—G. A worm gear 162 and a cam member 164 are integrally formed for rotation with axle 152 about axis G—G. Motor 124 is rigidly mounted within housing 122 upon a partition 166 and has a worm 168 mounted for rotation upon its output shaft 170 about an axis designated F—F in meshing arrangement with worm gear 162. Motor 124 is electrically interconnected with control circuit 42 (see FIG. 1) and controlled as described herein above with respect to the preferred embodiment of the invention. Likewise, it is contemplated that limit switches and a position sensor as described herein above would be incorporated in the alternative embodiment (not illustrated for the sake of brevity).

When motor 124 is energized, worm 168 rotates worm gear 162 and cam member 164 between set limits of travel. As best viewed in FIG. 6, cam member 164 is illustrated in its counterclockwise limit of travel. Cam member 164 has an arcuate slot 172 formed therein positioned to entrap pin 146 for desmodronic action wherein rotation of cam member 164 in a clockwise direction from that illustrated in FIG. 6 will cause carrier 126 and lever 136 to be drawn rightwardly along axis D'D due to tension in draw cables 26 and 28 and sliding caming contact with the outer radial edge 172a of slot 172. This rightward transition will continue until pin 146 (nearly) contacts the other end of slot 172 and simultaneously triggers a limit switch (not shown) to disable further rotation of motor 124 in the then current direction. Likewise, as cam member 164 rotates counterclockwise, its radially inward edge 172b defining slot 172 will cam against pin 146 tending to urge carrier 126 and lever 136 leftwardly toward the lefthand most end limit of travel as viewed in FIG. 6 against the tension of draw cables 26 and 28. This leftward transition will continue until pin 146 nearly contacts the end (illustrated) of slot 172 and simultaneously triggers the other limit switch (not shown) to disable further rotation of motor 124 in the then current direction.

Arcuate slot 172 is formed at a constant radius about a point designated 174 (see FIG. 6) on cam member 164. Point 174 is offset in a direction parallel axis D—D of guide member 130 intermediate spaced axis E—E of carrier 126 and G—G of axle 152.

The preferred embodiment of the invention illustrated in FIGS. 2-5, employs a lead screw driven moving pivot 20. The alternative embodiment illustrated in FIGS. 6-9, substitutes a cam member 164 for the lead screw to provide the transitional motion of the pivot. Slot 172 can have a variety of shapes which allows a tailoring of the required motor 124 torque. Cam member 64 when powered to rotate through angle of 90 degrees moves carrier 126 along guide member 130 a distance of one half the maximum throttle cable travel to effectively change the distance between throttle 12 and accelerator pedal 14.

The cam profile (shape of slot 172) can take many shapes. The preferred shape however appears to be a displaced center circle or constant radius arc. The center point 174 of the circle/arc falls on the center line of guide member 130. This arrangement gives a zero pressure angle for the cam 164 and follower 146 at the normal non-intervention pivot position. This is advantageous since the majority of pivot time will be spent in this position and there will be very little force trying to rotate the cam against the worm gear drive. Referring to FIG. 10, a plot of throttle spring generated cam reaction force is illustrated. Correlating with FIG. 6, positive cam rotation equates to clockwise rotation of cam member 164. Reaction force starts at zero for any initial throttle opening. In the case of throttle openings less than wide open throttle (W.O.T.), the cam reaction force will go to zero when the throttle reaches the closed position. The direction of this torque is to push the cam into the traction control direction to allow a fast response time. Motor 124 must generate more torque to exit traction control since motion in this direction is against the prevailing throttle spring forces.

It is to be understood that the invention has been described with reference to specific embodiments which provide the features and advantages previously described, and that such specific embodiments are susceptible of modification, as will be apparent to those skilled in the art. For example, although the embodiments of the invention describe a traction control system in which the intervention device can only reduce the throttle setting from that demanded by the operator, it is contemplated that the present invention could be equally applied to increase throttle setting above that demanded by the operator, provided that appropriate system safeguards were provided. Accordingly, the foregoing is not to be construed in a limiting sense.

What is claimed is:

1. A mechanism adapted to be interposed between an engine control device and an operator accelerator pedal for varying engine speed independently of operator demand, said mechanism comprising:
    a first member adapted for slaved movement with said accelerator pedal;
    a second member adapted for slaved movement with said control device;
    a shuttle member slidably disposed upon a fixed elongate guide member and defining a pivot thereon;
    a motion transfer element mounted for limited rotation upon said pivot about an axis normal to the line of elongation of said guide member and interlinking said first and second members, said first member connected to said element at a first attachment point and said second member connected to said element at a second attachment point, said attachment points being spaced from one another and from said pivot; and
    actuator means operative to selectively position said pivot to effect controlled displacement of said second member independent of displacement of said first member, said actuator means comprising a cam member mounted for controlled rotation about a fixed axis generally parallel to and spaced from said pivot axis, said cam member defining a cam surface engaging said pivot for selective positioning thereof as a function of the rotational position of said cam member.

2. The mechanism of claim 1, wherein said cam member defines a cam surface of substantially constant radius about a center point.

3. The mechanism of claim 2, wherein said center point is offset from the axis of rotation of said cam member.

4. The mechanism of claim 3, wherein said center point offset is directed along the axis of said elongate guide member.

* * * * *